W. B. TURMAN.
COMBINED COTTON GIN AND CLEANER.
APPLICATION FILED NOV. 3, 1909.
969,924.
Patented Sept. 13, 1910.
3 SHEETS—SHEET 3.
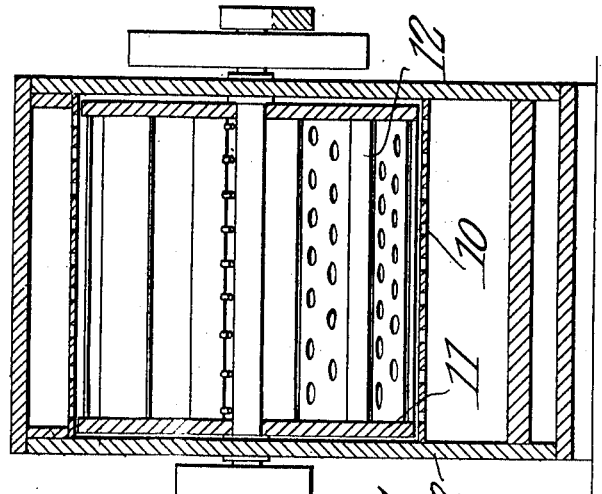
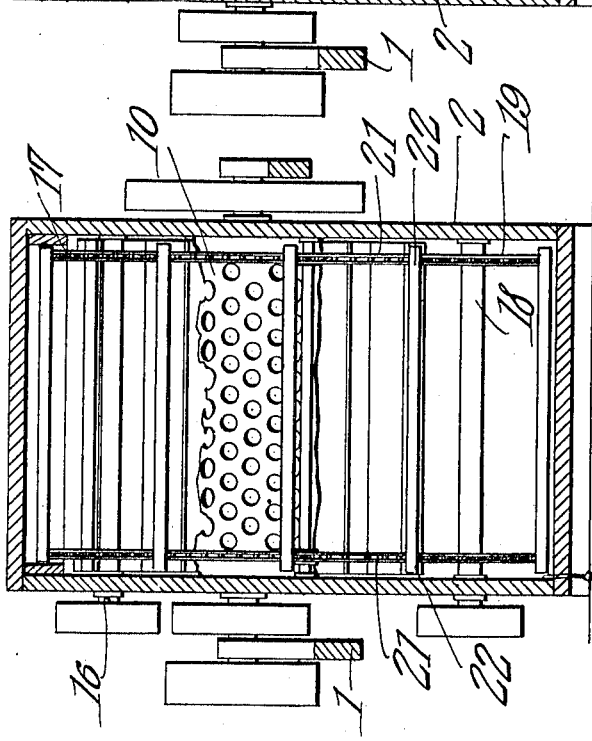
Witnesses
Inventor
William B. Turman.
By C. A. Snow & Co.
Attorneys

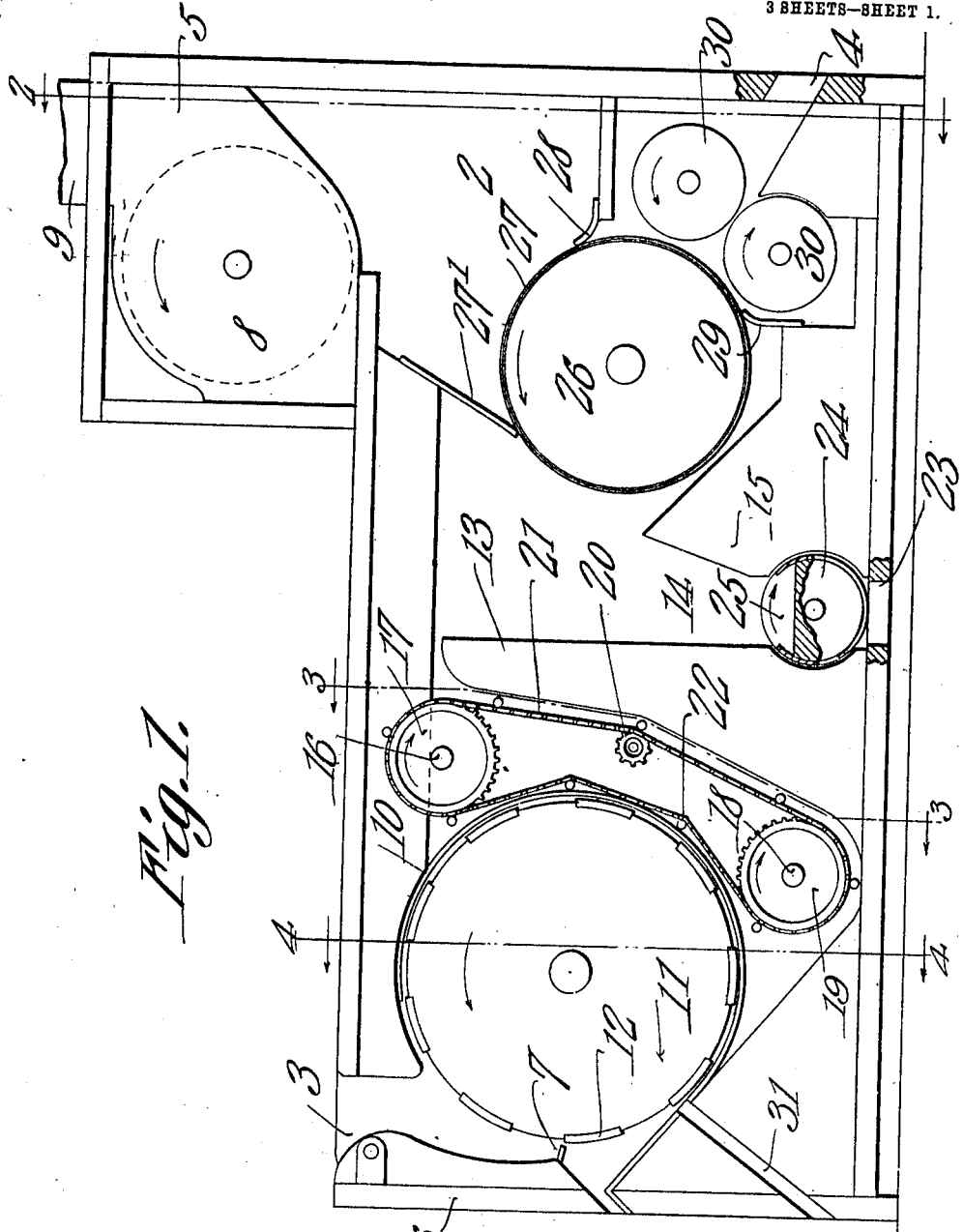

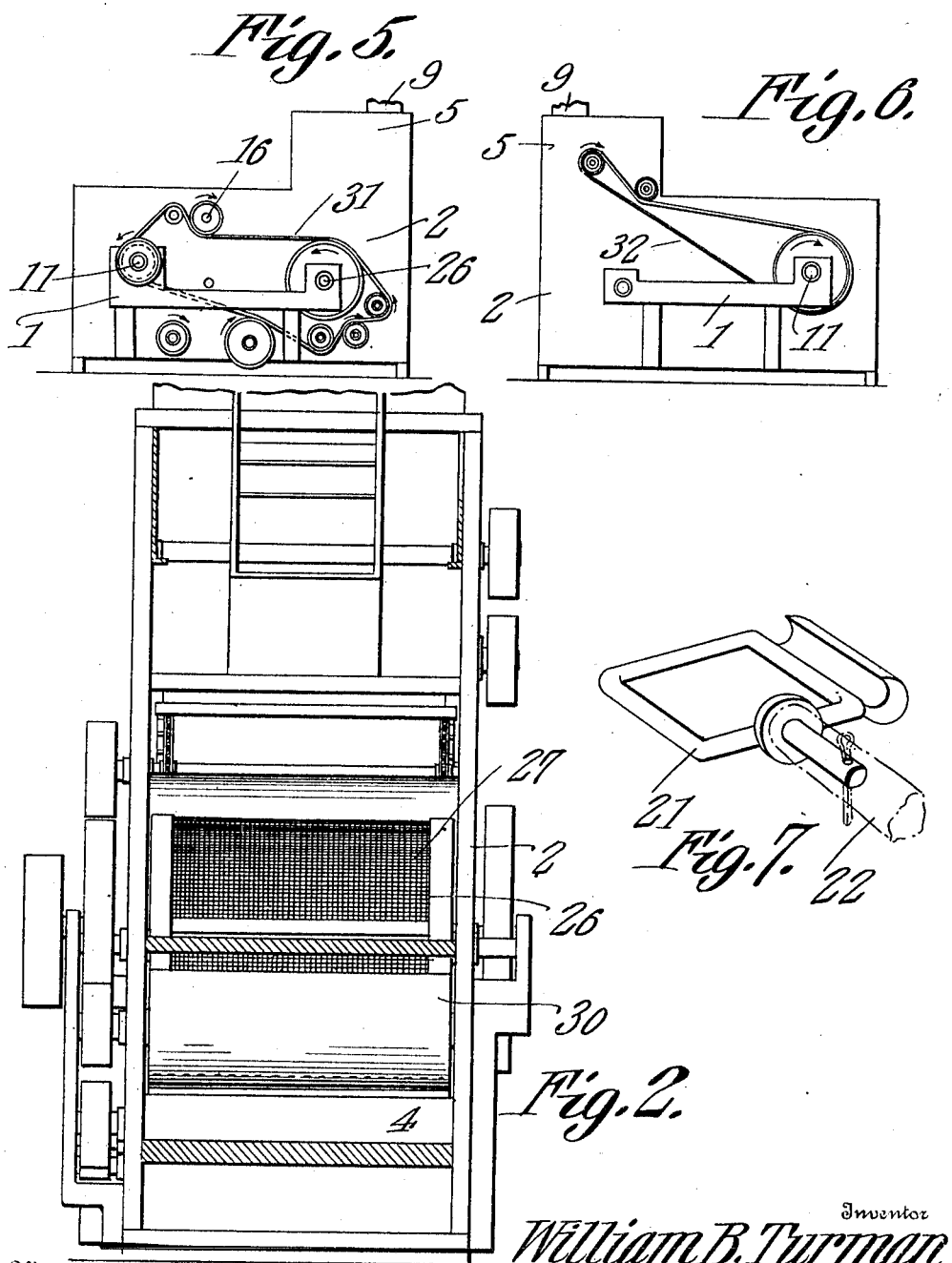

UNITED STATES PATENT OFFICE.

WILLIAM B. TURMAN, OF WALDRON, ARKANSAS.

COMBINED COTTON GIN AND CLEANER.

969,924.  Specification of Letters Patent. Patented Sept. 13, 1910.

Application filed November 3, 1909. Serial No. 526,085.

*To all whom it may concern:*

Be it known that I, WILLIAM B. TURMAN, a citizen of the United States, residing at Waldron, in the county of Scott and State of Arkansas, have invented a new and useful Combined Cotton Gin and Cleaner, of which the following is a specification.

This invention has relation to combined cotton gins and cleaners and it consists in the novel construction and arrangement of its parts as hereinafter shown and described.

The object of the invention is to provide a combination apparatus as indicated which is adapted to separate the lint from the seed by the combined action of a series of doffer bars acting at one side of a foraminous concave and a series of lint confining bars operating upon the exterior of the said concave. These parts are so arranged that when the lint is drawn through the openings in the concave it is engaged by the bars moving along the exterior of the concave and is held against the concave.

The doffer bars follow just behind the bars last mentioned and come in contact with the seeds and tear the seeds from the lint or vice versa. The lint thus separated from the seed is carried by a suction draft to a condenser and the delinted seed remains in the concave and by gravity falls through an outlet.

The ginning mechanism and the condenser are arranged in a case as is also an air suction device. A dust trap is arranged in the badger case between the ginning machanism and the condenser.

In the accompanying drawings: Figure 1 is a side elevation of the combined cotton gin and cleaner with one side of the case removed. Fig. 2 is a transverse sectional view of the same cut on the line 2—2 of Fig. 1. Fig. 3 is a transverse sectional view of the same cut on the line 3—3 of Fig. 1. Fig. 4 is a transverse sectional view of the same cut on the line 4—4 of Fig. 1. Fig. 5 is a side elevation of the invention illustrating how some of the movable parts are belted. Fig. 6 is a side elevation opposite to that shown in Fig. 5 showing how other movable parts of the apparatus are belted. Fig. 7 is a detail view showing the manner in which the lint confining bars which operate against the exterior of the ginning concave are mounted.

The combined cotton gin and cleaner includes a frame 1 within the side portions of which is located a case 2. The said case 2 is provided at one end with a feed inlet 3 and at its other end with a bat outlet 4 and in its upper portion with a dome 5. An apron head 6 is hingedly mounted at one end of the casing 2 and partially closes the feed opening 3 therein. Said apron is of usual structure and is provided with teeth 7. An exhaust fan 8 is located in the dome 5 and communicates with the dust flue 9.

A foraminous concave 10 is located in the casing 2 below the inlet opening 3 and a drum 11 is journaled for rotation in the said concave 10. The drum or cylinder 11 is provided at its periphery with a series of doffer bars 12 which extend parallel with the axis of the said cylinder. The said cylinder is made up merely of a shaft with heads located thereon and which are connected together by the said bars 12. The bars 12 are spaced one from the other throughout the series. A partition 13 is located in the casing 2 behind the concave 10 and the upper end of the said partition is spaced from the top of the said casing 2. A trash well 14 is formed behind the partition 13 and between the said partition and a partition 15 also located in the casing 2. The rear side of the concave 10 is spaced from the forward surface of the partition 13 and in the space thus provided is located a lint confining device which consists of an upper shaft 16 journaled in the casing 2 and having fixed sprocket wheels 17. A shaft 18 is located in the lower portion of the casing 2 and sprocket wheels 19 are arranged to rotate about the axis of the shaft 18. Idle sprocket pulleys 20 are journaled within the casing 2 and sprocket chains 21 are arranged to move in orbits around the wheels 17 and 19 and the rear runs of the said chains come in contact with the peripheries of the pulleys 20. Transversely disposed roller bars 22 are connected at their ends with the chains 21 and the said bars 22 are spaced one from the other at regular intervals. The bars 22 are so positioned upon the chains 21 that they travel in advance of the edges of the doffer bars 12 upon the cylinder 11 and the number of bars 22 correspond with the number of bars 12 and a bar 22 is arranged to coöperate with a bar 12 in denuding the cotton seed of its lint in a manner hereinafter to be explained. The case 2 is provided in its bottom with a trash outlet 23 which is located at the bottom of the trash well 14. A roller valve 24 is journaled for rotation in the bottom of the well 14 and is provided in its periphery with a cavity 25 which is adapted to receive trash and after said cavity moves directly over the outlet 23 the said trash may fall therefrom through the outlet 23 and thus the refuse is removed from the well 14 without permitting an air draft to pass up through the said well.

A condenser cylinder 26 is journaled for rotation in the casing 2 behind the partition 15 and the periphery of the said cylinder is preferably formed of wire netting 27 in the usual manner. A flexible flap valve 27' bears upon the upper portion of the cylinder 26 and a flexible flap valve 28 bears against the rear portion of the said cylinder. A flexible flap valve 29 bears against the lower portion of the cylinder 26 and bat forming rolls 30 are journaled for rotation in the lower rear portion of the casing 2 and the said rolls are located between the flap valves 28 and 29. Behind the bat forming rolls 30 is located the outlet 4 in the casing 2 above mentioned. As hereinbefore stated, Fig. 5 is a side elevation of one side of the machine showing how some of the moving parts are belted. The shaft of the cylinder 11 serves as the master shaft of the apparatus and the belt 31 is adapted to transmit movement from the said shaft to the shaft 16 and its connections, the condenser 26, the bat forming rolls 30 and the trash valve 24 in the manner as illustrated in Fig. 5 of the drawing. The belt 32 located at the opposite side of the casing 2 and illustrated in Fig. 6 is adapted to transmit motion from the master shaft of the cylinder 11 to the shaft of the fan 8. Thus it will be seen that the parts are so belted that the cylinder 11 rotates in the opposite direction from the shaft 16 and rotates in the same direction as the condenser cylinder 26. The bat forming rolls 30 of course rotate toward each other.

The operation of the combined gin and cleaner is as follows: The parts being in motion as indicated, seed cotton is fed through the opening 3 into the case against the inner side of the apron head 6. By reason of the fact that the said apron head is hingedly connected with the casing 2, the said head will force the seed cotton toward the periphery of the doffer cylinder and into the spaces between the bars 12 thereof and the said seed cotton will enter the space within the concave 10. At the same time suction draft is created through the casing 2 and the lint upon the seeds is drawn through the openings of the concave 10. As the bars 22 move along the exterior of the concave 10 they engage the projecting lint and draw the seeds down tight against the interior surface of the said concave 10. The doffer bars 12 following behind the confining bars 22 engage the seed and tear the seed from the lint. The seed remains in the concave 10 while the lint thus removed from the seed is caught by the suction draft and carried over the upper edge of the partition 13 and down toward the periphery of the condenser 26. Any heavy particles of foreign matter that might pass over the upper edge of the partitions with the lint will fall into the trash well 14 where it is collected and eventually passed out through the outlet 23 by the cylinder valve 24. Any finer particles of foreign matter which may follow the lint to the periphery of the condenser 26 will pass through the mesh of the screen forming the cylindrical portion of said condenser and will pass through the space between the flap valves 27' and 28 and up out through the casing of the fan 8 into the discharge flue 9. The lint which accumulates upon the periphery of the condenser 26 is carried around and is caught up by the bat forming rolls 30 and is passed out of the casing 2 through the discharge outlet 4. The seed admitted into the concave 10 remains therein until it is entirely denuded then falls by gravity through an outlet 31. Thus it will be seen that a ginning apparatus is provided which is adapted to effectually and economically remove the lint from the cotton seed without the use of saws or ribs.

Having described my invention, what I claim as new and desire to secure by Letters Patent is:—

1. A cotton gin comprising a casing having means for creating suction draft therethrough, a foraminous concave located in the casing, a cylinder journaled for rotation within the concave and having spaced doffer bars, and spaced lint confining bars arranged for movement upon the exterior and in contact with the exterior of the said foraminous concave.

2. A cotton gin comprising a casing having an inlet and outlet and means for creating suction draft therethrough, a foraminous concave located in the casing, a cylinder journaled for rotation within the concave and having spaced doffer bars, endless chains mounted for orbital movement behind the cylinder, lint confining bars attached to said chains and corresponding in number with the doffer bars upon the cylinder and arranged to move along and in contact with the exterior of the concave.

3. A cotton gin comprising a casing having an inlet and an outlet and means for creating a draft therethrough, a foraminous concave located in the casing, a cylinder journaled for rotation in the concave and having spaced peripheral doffer bars, a series of lint confining bars arranged for movement along the exterior of the concave, said lint confining bars corresponding in number with the doffer bars upon the cylinder and arranged to move slightly in advance of the doffer bars.

4. A cotton gin comprising a casing having an inlet and an outlet and means for creating a draft therethrough, a foraminous concave located in the casing, a cylinder journaled for rotation in the concave and having a series of spaced peripheral doffer bars adapted to move cotton seed along the concave, chains mounted for orbital movement behind the concave, lint confining bars connected at their ends with said chains and spaced from each other, said lint confining bars corresponding in number with the doffer bars upon the cylinder and arranged to move slightly in advance of the said doffer bars.

In testimony that I claim the foregoing as my own, I have hereto affixed my signature in the presence of two witnesses.

WILLIAM B. TURMAN.

Witnesses:
JAMES T. SATTERFIELD,
MOLLIE CENTER.